No. 719,197. PATENTED JAN. 27, 1903.
L. CRABTREE.
VITRIFIABLE PHOTOGRAPHIC DECORATION.
APPLICATION FILED JAN. 24, 1902.
NO MODEL.
WITNESSES:
INVENTOR
Louis Crabtree
BY
ATTORNEYS

UNITED STATES PATENT OFFICE.

LOUIS CRABTREE, OF NEWARK, NEW JERSEY, ASSIGNOR OF ONE-HALF TO SAMUEL T. ASTON, OF NEW YORK, N. Y.

VITRIFIABLE PHOTOGRAPHIC DECORATION.

SPECIFICATION forming part of Letters Patent No. 719,197, dated January 27, 1903.

Application filed January 24, 1902. Serial No. 91,074. (No specimens.)

*To all whom it may concern:*

Be it known that I, LOUIS CRABTREE, a subject of the King of Great Britain, and a resident of Newark, in the county of Essex and State of New Jersey, have invented new and useful Improvements in Vitrifiable Photographic Decoration, of which the following is a full, clear, and exact description.

The object of the invention is to provide certain new and useful improvements in vitrifiable photographic decoration for producing photographs more especially designed for decorative purposes on china, glass, earthenware, stoneware, enameled metals, or other material capable of vitrifiable decoration, the photograph appearing indestructibly on the finished article in a desired color and without a gelatin carrier.

The invention consists, essentially, in mixing a mineral color, such as is now used in the decoration of china and earthenware, with a binding substance, such as pure glycerin, to form a homogeneous pigment, to which is added a saturated solution of gelatin to hold the pigment in suspension, the mass being floated in a thin layer upon the surface of a carrying or transferring medium—such as paper, for instance—to form a coated plate, which is immersed in a solution of bichromate of potash to render the coating sensitive to the action of light and form a sensitive photographic plate. This sensitive plate is exposed to light under a suitable photographic negative and is then dipped in cold water for the purpose of moistening it, and then the exposed moistened plate is pressed in contact with the article to be decorated, the coating being next to the surface of the article. The moistening of the coating causes the latter to firmly adhere to the surface of the article. The moist coating readily adheres to the surface of the article, and the plate is now soaked in hot water, so that the carrying medium becomes detached from the coating and the parts of the pigment which have remained soluble are washed out, thus leaving the insoluble mineral color and gelatin on the surface of the article. The photograph thus produced on the article is allowed to dry and is now fired to vitrification in a suitable kiln, muffle, or oven. In the process of vitrification the binding substance and the gelatin used for the suspension of the pigment are completely destroyed by the heat, so that the mineral color which forms the photograph remains burned into the surface of the article, and is thus rendered indestructible.

In the drawing which forms part of this specification the figure is a face view of a porcelain dish or plaque having a body A and the photograph B burned in the surface thereof, as above described.

In practice I mix a quantity of mineral color of any desired shade with glycerin of about two-thirds of its own weight, and this mixture is ground exceedingly fine and then passed through a sieve to remove any lumps that may be in the mixture and to produce a thoroughly homogeneous pigment. This reduction of the color and glycerin is very important, as it insures a uniform suspension of the pigment in the gelatin and the consequent formation of a photograph having all the desired gradations of light and shade.

It is understood that in my process the mineral color and the glycerin form a pigment which is the base of the picture, and the gelatin is merely employed to hold the pigment in suspension during the process of forming the sensitive plate and while the exposed plate is applied to the article and washed to remove the insoluble portions. In the subsequent process of fixing the gelatin has no further function as far as the pigment is concerned, as the latter is burned into the surface of the article without hindrance by the gelatin, which in turn is destroyed by the heat applied.

The gelatin solution previously referred to is thoroughly mixed with the reduced color and glycerin and the resultant mass is floated in a thin layer upon the surface of the transferring or carrying medium to form a coated plate, which is immersed in a solution of bichromate of potash to render the coating sensitive to the action of light.

A six-per-cent. solution of bichromate of potash is preferably employed; but I do not limit myself to this solution, as any other substance, such as bichromate of ammonia, capable of rendering the coating sensitive to the action of light and becoming insoluble on exposure to light may be employed.

The effect of the bichromate of potash or like substance on the pigment is to render that portion of the pigment which is subjected to the rays of light during the exposure insoluble in hot water, and hence when the plate applied to the article is treated with hot water the remaining soluble portions of the pigment are readily washed out, so as to leave the insoluble pigment and gelatin on the article, the gelatin being destroyed in the subsequent operation of firing the article to vitrifaction.

If preferred, the photograph may be developed upon a sheet of paper specially prepared by being rubbed with wax dissolved in turpentine and then transferred to the article to be decorated, the article and photograph being then treated as above described.

A mineral color of any desired shade may be selected and mixed with the glycerin to form the pigment, so that the final photograph appears in a desired color that is in harmony with the color of the article and the decorations already thereon.

It is expressly understood that by my improvement it is of the utmost importance that the pigment suspended in the gelatin be rendered insoluble in hot water by the action of the bichromate of potash, so that the insoluble portion of the pigment remains as a photograph on the surface of the article after all the other substances have been removed by the action of the hot water and the firing.

Having thus described my invention, I claim as new and desire to secure by Letters Patent—

The herein-described method of producing vitrified photographic decoration on china, glass and other articles capable of vitrifiable decoration consisting in forming a base for the decoration to be produced by mixing a mineral color with glycerin, then adding gelatin to the base to form a mass in which the base is held in suspension, then applying the mass as a coating to a carrying medium to form a coated plate, then subjecting this plate to the action of bichromate of potash or its equivalent to render the coating sensitive to the action of light, then exposing the plate to the action of light under a negative, then applying the plate to the article to be decorated, with the coating in contact with the surface of the article, then subjecting the plate to the action of hot water to remove the carrying medium and wash out the soluble parts of the coating and leave the insoluble base as a photograph on the article, and finally firing the latter to vitrify the photograph on the article and to destroy the gelatin, as set forth.

In testimony whereof I have signed my name to this specification in the presence of two subscribing witnesses.

LOUIS CRABTREE.

Witnesses:
THEO. G. HOSTER,
EVERARD BOLTON MARSHALL.